United States Patent [19]

Roensch et al.

[11] Patent Number: 4,997,571

[45] Date of Patent: Mar. 5, 1991

[54] METHOD OF TREATING WATER

[75] Inventors: L. Fred Roensch, Chagrin Falls, Ohio; Hershel Zamechek, Canton, Conn.; Kelvin Y. Chang, Solon, Ohio; Eric J. Dlugosz, Maplewood, N.J.

[73] Assignee: Mogul Corporation, Chagrin Falls, Ohio

[21] Appl. No.: 461,174

[22] Filed: Jan. 5, 1990

[51] Int. Cl.$^5$ .............................................. C02F 5/10
[52] U.S. Cl. ........................................ 210/698; 55/53; 210/699; 210/701; 210/747; 210/754; 210/759; 210/760; 210/764; 210/908
[58] Field of Search ................... 55/53; 210/698–701, 210/747, 750, 754, 758–760, 764, 908, 909

[56] References Cited

U.S. PATENT DOCUMENTS

| | | | |
|---|---|---|---|
| 2,258,260 | 10/1941 | Rice ........................................ | 210/698 |
| 3,684,779 | 8/1972 | Rapko ..................................... | 210/701 |
| 4,126,549 | 11/1978 | Jones et al. ............................ | 210/701 |
| 4,167,973 | 9/1979 | Forte et al. ............................ | 210/908 |
| 4,288,327 | 9/1981 | Godlewski ............................. | 210/698 |
| 4,412,924 | 11/1983 | Feather ................................... | 55/53 |
| 4,443,340 | 4/1984 | May et al. .............................. | 210/698 |
| 4,451,376 | 5/1984 | Sharpe .................................... | 210/701 |
| 4,566,974 | 1/1986 | Masler et al. ......................... | 210/701 |
| 4,640,793 | 2/1987 | Persinski et al. ..................... | 210/698 |
| 4,892,664 | 1/1990 | Miller ..................................... | 210/747 |

FOREIGN PATENT DOCUMENTS 2035814  6/1980  United Kingdom .................... 55/53

Primary Examiner—Peter Hruskoci
Attorney, Agent, or Firm—Pearne, Gordon, McCoy & Granger

[57] ABSTRACT

A method of treating and removing volatile organic contaminants from ground water by treating the water with effective amounts of a water-soluble polymeric sequesterant comprising polymers derived from acrylic acid or organic acid, followed by the addition of a biocide, e.g., chlorine, and then subsequently passing the treated water through a packed column or air stripper wherein the volatile organic contaminants are removed by passing air in a counter-direction to the flow of water at temperatures ranging from about 40° to about 200° F.

13 Claims, No Drawings 4,997,571

METHOD OF TREATING WATER

FIELD OF THE INVENTION

This invention is directed to a method of treating and removing volatile organic contaminants from ground water and efficiently returning the water to the ground. The method comprises treating the water with effective amounts of water-soluble polymeric sequesterants, followed by the addition of a biocide, and subsequently passing the treated water to a packed column air stripper where the volatile organic contaminants are removed with air at temperatures ranging from about 40° to about 200° F.

BACKGROUND OF THE INVENTION

Naturally occurring water supplies, including ground water, often contain various minerals in different degrees, including such metal ions as iron, manganese, aluminum, chromate, calcium, magnesium, zinc, nickel, and the like. Generally, it is customary to filter these water supplies, particularly if they contain solids, by filtration, which, however does not remove any of the dissolved metal salts.

Accordingly, when water is treated to remove the volatile organic contaminants (VOC's) in a packed column, such as an air stripper, the metal ions, particularly iron and magnanese, precipitate as oxides, resulting in a fouled system. Ground water is also often contaminated with bacteria which dramatically increase the volume and rate of fouling of the air stripper and reinjection system. More specifically, a packed column used as an air stripper is a common approach to removing volatile organic contaminants (VOC's) from ground water. The air strippers function by passing the contaminated water through a tower, through which a large volume of air is blown in a direction counter to the flow of the water. The VOC's pass from the water into the air, leaving a cleaner water. The water is then put through a secondary treatment, or pumped directly back into the ground. Fouling of the reinjection basins or wells by iron oxides, manganese oxides, and bacteria is often a serious problem.

Approximately half the population of the United States uses ground water for drinking and various other purposes, and many agricultural industries depend on clean and safe ground water. Generally, the water flows straight from the ground into use with little treatment. Most of the consumption is from privately-owned wells, and there is comparatively little treatment before the water goes into use. However, even though packed column air strippers are found to be the most economical approach to cleaning ground water, they are often plagued with operating problems. Specifically, unless there is proper treatment to control mineral deposits and biological growth, fouling will build up on the tower surfaces and in the reinjection wells, thereby reducing efficiency. The contamination of the underground water supplies, however, comes from various hazardous materials, including, for example, garbage dumps, industrial waste, septic tanks, leaking storage tanks, e.g., gasoline tanks, and the like. With the growing problem of contaminated underground water, much is being done to minimize the potential for contamination through prevention and remediation.

Contamination of ground water caused by volatile organic compounds is of major concern, since most of the volatile contaminants enter the ground water from industrial spills, leaking pipelines and storage tanks. Accordingly, some of the most common forms of volatile contaminants are gasoline and related organic materials escaping from underground tanks and traveling readily with underground water flow. If the water were left untreated, the contamination would produce acute toxic effects as well as serious health problems. Remediation of volatile contaminants in ground water at a particular site begins with an assessment of the chemistry involved and the nature of the local aquifer. The volatilization of organic material from contaminated ground water is generally accomplished by the use of an air stripper. For example, an aerator blows air through the water to remove the volatile materials, but then may require some other method for removing the non-volatile materials.

In theory, all organic contaminations are treatable by a biological method. Since organics are composed mostly of carbon, hydrogen, and oxygen, they are a good source of food for microorganisms. Most of the biological treatments bring the contaminated water to the surface and run it through a biological reactor. The biological cleanup programs require a sensitive balance of the organic contaminants with the metabolic needs of the microorganisms. Cleanup programs can be enhanced by using air strippers to remove the bulk of volatile contaminants before passing water into a bioreactor to remove the non-volatile organic materials. The treatment of ground water with an air stripper is simply the use of a tower containing a packing medium through which the water and air flow in countercurrent direction. The relative concentrations of the volatile contaminants in the water volatilize into the air passing through the medium. The volatile contaminants are removed by the packed column stripper and are carried out into the air. Effective air stripping requires that contact between the air and water be maximized. Therefore, the design of the tower or packing in the packed column is critical, and may include several redistribution rings to ensure that the water does not channel along the walls of the stripper. Once a remediation program is established, continuous operation is an essential factor, since any time the air stripper is shut down, the underground water flow pattern changes and control of the contaminants in the ground is reduced. Accordingly, any factor which might take the air stripper off-line must be avoided. One of the most common problems facing air strippers is deposits caused by the natural minerals contained in the water and the biological foulings of the air stripper surfaces. Ground waters that are high in iron and other metal ions are particularly prone to deposition. Virtually all waters are subject to biological foulings.

Iron and various other metal deposits can be controlled through the use of inhibitors at low dosage levels. The chemistry of these inhibitors, however, must be carefully designed to operate at dosages that are sufficiently low to be appropriate for water reinjection. Where the air stripper is the only remediation equipment involved, the use of a microbiocide will eliminate microbiological growth and slime buildup within the air stripper and reinjection system, and therefore minimize biological fouling.

SUMMARY OF THE INVENTION

It is a purpose of this invention to provide a method of removing volatile organic contaminants from ground water by sequentially treating the water with a polymeric sequesterant and a biocide, followed by removal of the volatile organics with air in an air stripper.

It is another purpose of this invention to provide a method of inhibiting the growth and buildup of scale and microorganisms by treating ground water with effective amounts of water-soluble anionic sequestering agents and oxidizing biocides to prevent the precipitation of iron and other metal ions in the water treating systems.

DETAILED DESCRIPTION OF THE INVENTION

This invention relate to the process of treating and removing volatile organic contaminants from ground water by treating the water with small but effective amounts, e.g.. 1.0 to 300 parts per million of at least one water-soluble anionic polymeric sequesterant derived from an unsaturated carboxylic acid and subsequently adding to the treated water a biocidal amount, e.g., approximately 0.1 to 100 parts per million of at least one oxidizing biocide and subsequently passing the treated water through an air stripper where the volatile organic contaminants are removed with air at temperatures ranging from about 40° to about 200° F.

It was found that the use of a polymeric sequesterant prevents iron oxidation in an air stripper by binding the iron to form a complex which will not precipitate onto the surface of the equipment. Specifically, well water typically exists under reducing conditions where the iron exists primarily as ferrous ion (Fe+2). Upon being exposed to air or other oxidizing agents such as a peroxide or chlorine, the ferrous ion oxidizes to ferric ions (Fe+3) The ferrous ion is typically present as Fe+2, while the ferric ion exists as dehydrated oxide (Fe+3).

Not only do the polymeric sequesterants inhibit the precipitation of iron in the form of rust, but the polymers also inhibit the precipitation of other metals such as calcium carbonate, which results from the recarbonization of ground water. Recarbonization raises the pH, and often results in calcium carbonate scale.

From known solubility data, the Fe+2 ion is $10^{15}$ times more soluble at a pH 7 than the Fe+3 ion. Thus, iron is soluble in ground water as Fe+2, and upon exposure to air or other oxidizing agents, the iron becomes completely insoluble and, with the associated bacterial growth, is the most troublesome in fouling water treating systems. However, the addition of the polymeric sequesterants in accordance with this invention not only inhibits the deposition of iron to stop corrosion, but also causes chelation of the iron. Although the mechanisms are not completely understood, it is thought that the Fe+2 ion, being small and highly charged, attracts the polymer, causing a soluble, stable iron polymer complex.

Accordingly, this invention is directed to a method of inhibiting fouling and scaling caused by the precipitation of ferric ions and calcium carbonate. Certain water-soluble sequesterants selected from the group consisting of an organic acid or anionic polymeric sequesterants inhibit fouling and corrosion in water systems where iron-containing ground water is used as he water source. The organic acids include citric acid and tartaric acid.

Various unsaturated carboxylic acids or salts thereof may be used as the monomers in preparing the polymeric sequesterants for purposes of this invention For example, acrylic acid, methacrylic acid, maleic acid, itaconic acid, vinyl acetic acid, fumaric acid, carboxyalkyl acrylic acid, and the salts and mixtures thereof may be used in preparing polymeric sequesterants.

The preferred carboxylic acids are acrylic acid, methacrylic acid, β-carboxyethylacrylate, maleic acid, fumaric acid, itaconic acid, and their salts. The most preferred carboxylic acids are acrylic acid, methacrylic acid and their salts. Other acids and derivatives thereof include 2-acrylamido-2-methylpropylsulfonic acid, 2-methacrylamido-2-methylpropylsulfonic acid, styrene sulfonic acid, vinyl sulfonic acid, sulfoalkyl acrylate or methacrylate, allyl sulfonic acid, methallyl sulfonic acid, 3-methacrylamido-2-hydroxy propyl sulfonic acid, sulfonic acid acrylate, and mixtures thereof. The preferred sulfonic compounds are 2-acrylamido-2-methylpropylsulfonic acid, 2-methacrylamido-2-methylpropylsulfonic acid, allyl sulfonic acid, styrenesulfonic acid, vinylsulfonic acid and their salts. The most preferred sulfonic acids are 2-acrylamido-2-methylpropylsulfonic acid 2-methacrylamido-2-methylpropylsulfonic acid and their salts.

The polymers of the instant invention may be prepared from 35 to 90%, preferably 50-70%, by weight, of an unsaturated carboxylic acid or salt, and from 10 to 65%, preferably 30-50%, by weight, of an unsaturated sulfonic acid, or salt. Other polymers of this invention are prepared from 35 to 90%, preferably 50-70%, by weight, of an unsaturated carboxylic acid or its salt, and from 10 to 65%, preferably 30-50%, by weight, of an unsaturated, pendant polyalkylene oxide compound, The polymers may be prepared by mixing the monomers preferably in the presence of a free radical initiator. Any free radical initiator may be used. Examples include peroxides, azo initiators, and redox systems. The polymerization may be initiated photochemically. The preferred catalysts are sodium persulfate and sodium metabisulfite or a mixture of ammonium persulfate and any azo-type initiator, such as 2,2'-azobis-(2,4-dimethyl-4-methoxyvaleronitrile).

The polymerization may be conducted by any of a variety of procedures, for example, in solution, suspension, bulk and emulsions. The reaction will generally occur between 10° and 100° C. The reaction, depending on the temperature, generally takes from 5 minutes to 12 hours. Measuring for residual monomer will verify when the reaction is complete.

The polymers are initially identified by intrinsic viscosity. The preferred intrinsic viscosity ranges from 0.05 to 2.5, preferably 0.05 to 0.5 dl/g, in 1.0M sodium chloride (measured on a 75 Cannon Ubbelohde capillary viscometer). These polymers are added to the water in a minimum dosage of 0.1 ppm, preferably 0.1 to 300 ppm most preferably 0.1 to 100 ppm or 1.0 to 25 ppm.

Preferred polymers and copolymers are derived from acrylic acid and its derivatives having the structure

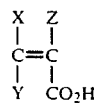

wherein X, Y, and Z are either hydrogen, $CH_3$, $CO_2H$, $CH_2CO_2H$, $CH_2OH$, $CH_2CH_2OH$, or $CH_2CH_2CH_2OH$.

More specifically, some of the preferred polymers particularly useful as the sequesterant for purposes of this invention include tetrapolymers derived from acrylic acid, acrylamide, methacrylic acid, and ethoxyethylacrylate, available under the trademark GOODRITE K-796, copolymers derived from acrylic acid, and acrylamidomethylpropanesulfonic acid, terpolymers derived from acrylic acid-acrylamidomethylpropanesulfonic acid vinyl acetate, copolymers derived from styrenesulfonic acid-maleic anhydride, terpolymers derived from acrylic acid-acrylamidomethylpropanesulfonic acid-phosphinocarboxylic acid, available commercially as BELCLENE-400, terpolymers derived from acrylic acid-methacrylic acid, and itaconic acid, polymaleic anhydride available commercially as BELCLENE-200, terpolymers derived from maleic anhydride-vinyl acetate-ethylacrylate, commercially available as BELCLENE-283, and copolymers derived from acrylic acid and acrylamide, available as CYANAMER P-70.

In addition to the treatment of the ground water with the polymeric or organic acid stabilizers, it is essential to add, after the addition of the sequesterant, small but effective amounts of at least one biocide to control the microorganism content of the water. Generally, the addition of an oxidizing biocide, such as chlorine, hydrogen peroxide potassium permanganate, or ozone, oxidizes the ferrous iron to ferric, causing precipitations in the air stripper. However, by the addition of the sequesterant prior to the treatment of the water with the biocide, the metal ions, including manganese and iron are sequestered with the polymer, and therefore do not precipitate on the surfaces of the air stripper or in the reinjection system. The oxidizing biocides which are particularly useful include the chlorine-containing oxidants, comprising the inorganic hypochlorite salts, hypochlorous acid, hypobromous acid, chlorine, bromine, the peroxides, permanganate or ozone and the like. The biocides are generally added to the water systems in small but effective amounts to control the microbiological growth, e.g., as little as 0.1 and up to about 300 ppm, and more likely in amounts ranging from about 0.5 to 5.0 ppm.

In accordance with this invention, to prevent iron or manganese oxidation or calcium carbonate precipitation, the ground water is first treated with effective amounts, e.g. from 0.1 up to 300 or 0.1 to 100 parts per million of a water-soluble anionic polymeric sequesterant derived from an unsaturated carboxylic acid such as polymeric acrylic acid having average molecular weights ranging up to about 1,000,000, i.e., 10,000 to 50,000. and subsequently adding to the water treated with the sequesterant a small but effective amount of at least one biocide, such as chlorine and/or hydrogen peroxide, in amounts ranging from 0. 1 up to about 100 ppm, i.e., 1.0 to 2.5 ppm, and then subsequently passing the treated water to the top of an air stripper wherein air is passed in a direction counter to the flow of the water at temperatures ranging from about 40° to 200° F. to remove all volatile organic contaminants. The treated water is then passed through a secondary treatment system for further use, or pumped directly back into the ground.

Without the treatment as provided herein, the biological fouling and mineral deposits, particularly iron and bacteria, will build up on the tower surfaces, thereby reducing the efficiency of the system. By following the appropriate treatment, not only is the efficiency of the air stripper and reinjection system maintained, but also expensive acid cleanups are avoided. In the past, when the stripper towers were fouled, it was necessary to clean the system with strong acids. This was accomplished by shutting down the tower for extended periods of time while treatment was taking place, resulting in loss of time and increasing the environmental problems.

While this invention has been described with respect to a number of embodiments, it is obvious that there are other variations and modifications which can be employed without departing from the spirit and scope of the invention as set forth in the appended claims.

The invention claimed is:

1. A method of treating and removing volatile organic contaminants from ground water which comprises treating the water with about 0.1 to 300 parts per million parts of the water of at least one water-soluble sequesterant selected from the group consisting of an organic acid and anionic polymeric sequesterant having an average molecular weight ranging up to about 1,000,000 derived from an unsaturated carboxylic acid monomer, and subsequently adding to said treated water a biocidal amount of at least one oxidizing biocide, and then passing said water through an air stripper to remove volatile organic contaminants with air at temperatures ranging from about 40° to 200° F., wherein said sequesterant and said biocide are added in effective amounts to inhibit the growth and buildup of scale and microorganisms is said air stripper.

2. The method of claim 1 wherein the polymeric sequesterant has an average molecular weight ranging up to about 50,000 and is derived from an acrylic acid.

3. The method of claim 2 wherein the biocide is used in an amount ranging from about 0.1 to 100 parts per million.

4. The method of claim 3 wherein the biocide is chlorine or a chlorine-containing inorganic compound.

5. The method of claim 1 wherein the biocide is hydrogen peroxide, potassium permanganate, or ozone.

6. The method of claim 1 wherein the sequesterant is citric acid or tartaric acid or hydroxyacetic acid (glycolic) or lactic acid.

7. The method of claim 6 wherein the oxidizing biocide is chlorine added to the water in an amount ranging from about 0.5 to 5 parts of chlorine per million parts of water.

8. The method of claim 6 wherein the biocide is hydrogen peroxide, potassium or sodium permanganate, or ozone.

9. The method of claim 1 wherein the polymeric sequesterant is added to the ground water in an amount ranging from about 1.0 to 25 parts per million parts of the water and is a terpolymer derived from monomers of acrylic acid, acrylamidomethylpropanesulfonic acid and phosphinocarboxylic acid.

10. The method of claim 1 wherein the polymeric sequesterant is polymaleic anhydride.

11. The method of claim 1 wherein the polymeric sequesterant is a terpolymer derived from acrylic acid, acrylamide, methacrylic acid and ethoxyethylacrylate.

12. The method of claim 1 wherein the polymeric sequesterant is a polymer of acrylic acid having a molecular weight ranging up to about 50,000.

13. The method of claim 12 wherein the oxidizing biocide is chlorine added to the water in an amount ranging from about 0.1 to 300 parts of chlorine per million parts of water.

* * * * *